United States Patent [19]

Bernhardt et al.

[11] 4,004,069

[45] Jan. 18, 1977

[54] UNSATURATED ETHYLENE-VINYL ACETATE COPOLYMERS AND UNSATURATED POLYETHYLENES AND METHODS OF PREPARING SAME BY PARTIAL OR EXHAUSTIVE DEACETYLATION OF ETHYLENE-VINYL ACETATE COPOLYMERS

[75] Inventors: Günther Bernhardt, St. Augustin; Werner Trautvetter; Rudeger Minke, both of Troisdorf, all of Germany

[73] Assignee: Dynamit Nobel Aktiengesellschaft, Troisdorf Bez. Cologne, Germany

[22] Filed: Oct. 30, 1974

[21] Appl. No.: 519,906

[30] Foreign Application Priority Data

Nov. 6, 1973 Germany .......................... 2355320
Dec. 17, 1973 Germany .......................... 2362664

[52] U.S. Cl. .................................. 526/48; 526/27; 526/30; 526/14; 526/22

[51] Int. Cl.² .............. C08F 210/02; C08F 218/08; C08F 8/50

[58] Field of Search ................. 260/87.3; 450/619; 526/48, 27, 30

[56] References Cited

UNITED STATES PATENTS

| 2,388,169 | 10/1945 | McAlevy et al. ............ 260/87.3 X |
| 3,451,983 | 6/1969 | van Saane et al. ............ 260/87.3 |

Primary Examiner—William F. Hamrock
Attorney, Agent, or Firm—Burgess, Dinklage & Sprung

[57] ABSTRACT

A method of deacetylation of ethylene-vinyl acetate copolymers to produce the corresponding olefinicaly unsaturated, linear polymers. The ethylene-vinyl acetate copolymers are deacetylated under a vacuum of less than about 50 Torr, by splitting acetic acid from the copolymers, and while continuously stirring the copolymers.

24 Claims, No Drawings

UNSATURATED ETHYLENE-VINYL ACETATE COPOLYMERS AND UNSATURATED POLYETHYLENES AND METHODS OF PREPARING SAME BY PARTIAL OR EXHAUSTIVE DEACETYLATION OF ETHYLENE-VINYL ACETATE COPOLYMERS

BACKGROUND

Ethylene-vinyl acetate (EVA) copolymers are random copolymers of ethylene and vinyl acetate. They are widely used as cable insulating compositions, as hot-melts, or in the form of sheets.

One outstanding characteristic is their good thermal stability. Fabricating temperatures up to 240° C are used for many EVA copolymers without resulting in decomposition.

The evolving of acetic acid, from sheet materials for example, would be highly undesirable, since it would result in damage to the packaging and to the goods packed.

On the other hand, a controlled partial or complete splitting off of acetic acid from the unfabricated polymeric raw material with the formation of carbon-to-carbon double bonds would be very attractive because this would make available novel, unsaturated EVA copolymers or unsaturated polyethylenes which might be starting products for a series of new products or syntheses. The splitting off can also be used for analytic analysis. See infra.

In this specification the term "deacetylation" will be used to refer to the cleavage of acetic acid from the vinyl acetate building block or group

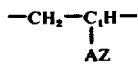

of the EVA copolymers with the formation of a double bond issuing from the $C_1$ atom, without the occurrence of secondary reactions such as oxidation, cross-linking, absorption of an acid ester or other atoms or atom groups, molecular cleavage, or conversion of the macromolecule. In the formula, AZ is an acetate group.

The cleavage of acetic acid from EVA copolymers for the purpose of the analytic detection of the vinyl acetate polymerized into EVA copolymers is known. For example, a pyrolytic cleavage of acetic acid from EVA copolymers for the analytic detection of the bound vinyl acetate has been described by D. Braun in "Mitteilungen aus dem Deutschen Kunststoff-Institut," Darmstadt, No. 12, page 3 (1972). In this process decomposed residues and highly crosslinked residues are produced.

R. C. Schulz and collaborators describe a method of analysis for the quantitative determination of vinyl acetate in EVA copolymers through the treatment of these copolymers with an approximately 30-fold excess of molten toluenesulfonic acid at 160° C ("Die Angewandte Makromolekulare Chemie" 24 (1972) 171–175). In this case, too, the greatly discolored residues are unusable.

THE INVENTION

Surprisingly, it has now been found that, through a controlled partial or exhaustive deacetylation of EVA copolymers, intact, non-crosslinked, unsaturated EVA copolymers or unsaturated, non-crosslinked polyethylenes can be obtained if the deacetylation is performed under certain conditions and while working the polymer as by stirring.

It has been found in accordance with the method of the invention that it is of decisive importance to the achievement of deacetylation without the above-named disadvantages that the acetic acid that is formed be removed from the reaction mass immediately after its formation.

Subject matter of the invention is therefore a method of preparing unsaturated and uncrosslinked EVA copolymers or unsaturated, uncrosslinked polyethylenes of high molecular weight through the partial or complete deacetylation of EVA copolymers or mixtures of EVA copolymers of various vinyl acetate content, which is characterized by the fact that the acetic acid released in the deacetylation is removed, immediately after its development, from the constantly stirred reaction mass under a constant vacuum of about 50 Torr or less.

Throughout the reaction the acetic acid is continually removed by means of an applied vacuum of 50 Torr or less, down to 0.1 Torr. It is desirable that the reaction mass be constantly stirred or kneaded and that a fresh surface on the reaction mass be constantly exposed within the reaction chamber by suitable means, so as to permit a rapid diffusion of the acetic acid.

Furthermore, in accordance with the method of the invention it is of decisive importance to the preparation of the unsaturated, non-crosslinked substances that the detention time in the reactor be kept short and that the deacetylation be performed with the correct temperature range. The time of the detention of the mass in the reaction chamber for deacetylation can amount to as much as 30 minutes, although generally shorter detention times of 1 to 5 minutes are preferred.

Particularly short deacetylation time can be achieved by adding to the EVA copolymers catalysts in the form of protonic acids or Lewis acids, which are known and have been described in monomer chemistry as catalysts for cleaving acetic acid from its esters for the production of olefins.

Deacetylation within 5 minutes and less is thus achievable, which is decidedly preferred in continuous processes.

If the acetic acid is immediately removed from the reaction mass, at 300° C a partial deacetylation occurs at not very high speed, with the formation of double bonds, some acetate groups remaining intact. In the 300° to 350° C temperature range, a rapid partial or complete deacetylation takes place without any substantial decomposition of the macromolecules.

Above 350° C, the deacetylation takes place more rapidly, but, in addition to the acetic acid elimination, more profound transformations take place in the macromolecule. For example, at 360° C, or sometimes 370° C, and in any case at around 400° C, the deacetylation is also accompanied by an increasing crosslinking of the polymeric residue. Above 400° C severe destruction of the macromolecules occurs due to chain cleavage. The average molecular weights diminish greatly and the deacetylated products are brittle and foul-smelling.

It is the purpose of this deacetylation, however, to sustain the degree of polymerization of the starting EVA copolymers and to produce alterations in the macromolecule exclusively by splitting off acetic acid with the formation of double bonds; therefore, temperatures of 160° to 350° C are preferred for the claimed method of the invention. For complete deacetylation it is especially important to keep the deacetylation temperature between 300° and 350° C. The temperature being referred to is the mass temperature, that is, the temperature of the reaction mixture.

In accordance with the invention, EVA copolymers having vinyl acetate contents from 0.5 to 60 wt.-% preferably from 0.5 to 50 wt.-%, can be partially or completely deacetylated. The percentage is the wt.% of vinyl acetate moieties or groups

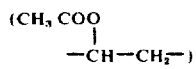

in the polymer.

For complete deacetylation, EVA copolymers are especially preferred as starting material which contain up to about 25 wt.-% vinyl acetate, or else mixtures of EVA copolymers having a low vinyl acetate content with those having a high vinyl acetate content, but whose average vinyl acetate content does not exceed 25 wt.-%, because occasionally, even with good catalysts and short reaction times of no more than a few minutes, and favorable temperatures between 300° and 330° C, an incompletely understood, often very slight crosslinking can occur, which should be avoided in the interest of reliable workability of the thermoplastic products. In special cases it is desirable to perform the complete deacetylation on copolymers containing no more than 18% vinyl acetate by weight.

The products can be tested for the presence of cross-linked components by dissolving them in suitable hot organic solvents. Suitable for this purpose are numerous solvents, as for example hydrocarbons such as benzines having boiling ranges of 80–100 or 140°–200° C, aromatics such as benzene, toluene or xylene, chlorinated hydrocarbons such as chloroform, carbon tetrachloride or chlorobenzene, and tetrahydrofuran and others.

Mixtures of EVA copolymers of different vinyl acetate contents are also capable of partial or complete deacetylation in accordance with the invention.

The deacetylation catalysts can be Lewis acids, such as, for example, aluminum chloride, aluminum bromide, cadmium chloride, beryllium chloride, palladium chloride, gallium trichloride, titanium(IV) chloride, titanium(IV) bromide, zirconium(IV) bromide, tin(II) chloride, tin(II) bromide, tin(II) iodide, tin(IV) chloride, tin(IV) bromide, antimony(V) chloride, iron(III) chloride, iron(III) bromide, zinc chloride, zinc fluoride, zinc bromide, zinc iodide or uranyl chloride, or, for example, protonic acids such as α-naphthalenesulfonic acid, β-naphthalenesulfonic acid, o- or m-toluenesulfonic acid, pyrophosphoric acid, metaphosphoric acid, sulfuric acid, 1,3-naphthalenesulfonic acid or 1,7-naphthalenedisulfonic acid. Also combinations of two or more of the above-named deactylation catalysts both of the Lewis acid type and of the protonic acid type, and mixtures of both types together, are possible.

To prevent undesired oxidations at the C—C double bonds that are formed, the deacetylation must take place with the exclusion of the oxygen of the air. It is therefore desirable to use a shielding gas during the deacetylation process, at least the entrance zone and the emergence zone being flooded with the shielding gas. Any inert gas can serve as shielding gas. The use of carbon dioxide or nitrogen, or in some cases argon or helium, is preferred.

The combining of the EVA copolymers with the catalyst can be effected by mixing them together in a mixer such as a Henschel mixer or a Papenmeier stirrer. The catalyst may be used either in solid or in liquid form, and the EVA copolymer may be in the form of granules or powder. During the mixing of the EVA copolymer and catalyst the temperature will be, as a rule, from −30° to 150° C. EVA copolymers of high vinyl acetate content, when energetically stirred in the mixer, tend to be made sticky by the heat thus produced, which interferes with the mixing and uniform distribution of the catalyst, so that provision must be made for sufficient removal of heat by cooling the mixing vessel. The catalyst can also be incorporated into the EVA copolymers by means of a heated roller mixer or by means of a heated kneader. An intimate intermixture of the EVA copolymer and catalyst can be achieved by mixing the two components in a heated extruder. The method is particularly well suited for a continuous mixing process.

The EVA copolymers in granular or powder form can also be imbibed with or dissolved in a catalyst solution. It is advantageous to select those solvents or solvent mixtures which easily dissolve the catalyst and are easily absorbed by the EVA copolymers, examples being acetic acid ester, benzene, toluene etc.

The solvent or solvent mixtures are best removed prior to the deacetylation process, by evaporation at reduced pressure in some cases if they have been used in relatively large quantity. Solvent residues remaining in the copolymer, however, will not interfere with the deacetylation.

In like manner, the EVA copolymer and the catalyst can be dissolved together in a suitable solvent or solvent mixture, or solutions of the two substances can be combined. Suitable solvents for the polymer are, for example, benzine, aromatics, especially benzene, toluene or xylene, and chlorinated aliphatics, especially those having 1 and 2 carbon atoms. The evaporation of the solvent is best performed in vacuo.

It is also possible to add the catalyst, either directly or during the production of the EVA copolymer, to the existing solution, emulsion or suspension of the polymerization, so that an EVA copolymer will be obtained which, after the customary working up of the polymer by precipitation, drying, etc., will already contain the deacetylation catalyst in finely divided form.

The combining of the EVA copolymer with the catalyst and the deacetylation procedure can be performed separately and at different times. It can be performed immediately or directly after formation of the EVA.

It is also possible to combine the EVA copolymer with the deacetylation catalyst by mixing them together in the apparatus provided for the deacetylation, in which case the temperature can be lower than that of the deacetylation, or the same temperatures, vacuum, etc., may prevail as in the deacetylation. It is advantageous to do the mixing directly prior to the deacetylation in continuous deacetylation apparatus, such as heated mixing screws, screw conveyors, or, preferably, in the first chambers of a vacuum extruder equipped with a plurality of chambers, in which the polymer is simultaneously kneaded and advanced by the screw or screws within the chamber or chambers into one of the succeeding, hotter vacuum chambers where the deacetylation takes place.

In the deacetylation process the reaction vessel may be, for example, a heated stirring autoclave which is equipped with a paddle stirrer running along the walls and a connection for the alternate infeed of an inert gas and the application of a vacuum. The vacuum, which can be produced by a water jet pump or oil pump, and the constant movement of the reaction mass, can easily remove the liberated acetic acid from the reaction chamber.

It is also advantageous to use an autoclave with a bottom drain, since this facilitates the removal of the deacetylated, usually viscous product by the application of a slight amount of pressure to the bottom aperture.

The deacetylation is performed particularly advantageously in a heated and evacuatable apparatus in which the material is continuously advanced while being mixed, especially a vacuum extruder, because then the deacetylation can be performed continuously. The partially or completely deacetylated EVA copolymer, after emerging from the vacuum extruder, can be immediately led through a cooling bath and then be granulated.

Quite especially advantageous is continuous deacetylation in multiple-screw vacuum extruders which have a plurality of kneading and advancing zones, e.g., a plurality of kneading disks and intermeshing screws disposed in series, and also a plurality of temperature zones which can be heated at different temperatures, and a plurality of independent vacuum zones. By the appropriate selection of the extruding die, the material can be shaped into finished products immediately following the deacetylation in this case. Particularly well suited is a vacuum extruder heated to the deacetylation temperature and equipped with two separate proportioning systems, such as proportioning weigh-scales, one for the EVA copolymer and the other for the catalyst.

The degree of deacetylation can be controlled by the detention time or the mass temperature at the place of deacetylation. Also, the degree of deacetylation can be controlled by means of the catalyst concentration and by the use of catalysts or catalyst mixtures of different cleavage activity.

The increasing of at least one of the above-named parameters will result in an increase in the degree of deacetylation, but a lowering thereof will result in a decrease in the degree of deacetylation.

By the term, "degree of deacetylation," as used herein, is meant the quotient of the quantity of acetic acid which has been cleaved from a deacetylated EVA copolymer of a specified vinyl acetate content, divided by the total amount of acetic acid originally present in the EVA copolymer. At an acetic acid removal of 100%, the quotient attains the value 1; if there is no cleavage the quotient will be 0.

Examples of catalysts of low cleavage activity are: metaphosphoric acid, aluminum tribromide, cadmium chloride, beryllium chloride, uranyl chloride, gallium trichloride and palladium chloride.

Catalysts of medium cleavage activity are, for example: iron(III) chloride, titanium(IV) chloride, titanium (IV) bromide, aluminum trichloride, zirconium(IV) chloride and orthophosphoric acid.

Catalysts of high cleavage activity are, for example: tin(IV) chloride, tin(IV) bromide, mono- and disulfonic acids of naphthalene, and o-, m- or p-toluenesulfonic acids.

Catalysts having an exceedingly high cleavage activity are zinc chloride and zinc bromide.

The degree of deacetylation bears a relationship, through the amount of acetic acid removed, to the amount of double bonds that are formed, because for each mole of acetic acid that is removed, precisely—or almost precisely—one mole of double bonds, measurable by the iodine number, is formed.

The production of a certain degree of deacetylation of EVA copolymers is accordingly possible through the selection of catalysts of different cleavage activity, through the catalyst concentration, through the detention time and through the mass temperature at the place of deacetylation. $\overline{P}_n$ is the average number of units corresponding to the monomers in the chain, i.e. the sum of ethylene, vinylene, and vinyl acetate groups in the chain.

The amount of double bonds formed has been determined by means of a modified method of iodine number determination according to Kaufmann. The partially or completely deacetylated specimens were dissolved at 60° C in hot chlorobenzene and an excess of an adjusted methanol solution of bromine and sodium bromide was added. Unconsumed bromine was reduced with a potassium iodide solution and determined by titrating the liberated iodine with thiosulfate.

The iodine number in that case is the quantity of iodine, expressed in grams, which has been consumed per 100 grams of the partially or completely deacetylated EVA copolymers.

The amount of acetic acid split off was determined indirectly through the residual acetate content in the deacetylated products as determined by thermogravimetric analysis. End temperature: 420° C at a heating rate of 8° C/min.

The average degrees of polymerization $\overline{P}_n$ of the partially or completely deacetylated EVA copolymers were calculated from the determined molecular weights (average $\overline{M}_n$), taking into account the amount of residual acetate and the vinyl units formed. The molecular weight determinations were performed in a Mechrolab membrane osmometer at 85° C in o-dichlorobenzene as solvent.

Additional subject matter of the invention is unsaturated, un-crosslinked EVA copolymers and unsaturated, un-crosslinked polyethylenes with random distribution of the double bonds, and double bond contents up to a maximum of 10 mole %, and vinyl acetate contents from 0 to 32.3 mole-%, corresponding to 59.5 wt.-%. These substances belong to a new class of polymers, and surprisingly they have their double bonds exclusively or overwhelmingly in the form of trans vinylene double bonds. The double bond is decidedly recognizable as a trans bond

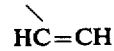

on the chain by means of a $\delta_{CH}$ deformation vibration at 965 cm$^{-1}$ in the infrared spectrogram; also, in the partially acetylated products, by the valence vibration $\nu_{C=O}$ of the acetate group at 1745 cm$^{-1}$, while both the $\delta_{CH}$ vibration of the cis double bond at 720 cm$^{-1}$ and the $\delta_{CH}$ vibration of the vinyl group at 905 cm$^{-1}$ are lacking. The new polymers are accordingly polymers which, in comparison with the building blocks of the EVA copolymers from which they were formed, have the ethylene group and the vinylene group as building blocks, plus, in the case of the partially deacetylated products, the acetate radical bonded thereto and extending from the chain. The degree of polymerization is surprisingly the same, or nearly the same, as the polymerization degree of the EVA starting material.

In particular, no methodical tendency for the products to have higher degrees of polymerization than the starting materials is to be observed. Since elastomeric or viscous-elastic EVA copolymers are preferably the starting materials, the end products have mostly the same degree of polymerization as they do, which will range around $P_n = 200$ to 3000, preferably between 500 and 2500, but can occasionally assume values up to 8000. However, EVA copolymers of lower or higher average polymerization can be deacetylated.

The acetate content of the partially deacetylated products can be the acetate content of the EVA starting materials, minus the acetic acid split off by the deacetylation. Since vinyl acetate contents of 0.5 to 62, and especially 3.0 to 50% by weight are common in the starting material, vinyl acetate contents in the product of up to 59.5, especially up to 49.5, are possible, although lower vinyl acetate contents, due to the use of starting materials having vinyl acetate contents up to about 48 wt.-%, and to the double bonds that are formed, will be the rule. Vinyl acetate contents between at least 2 to 4 wt.-% and about 47 wt.-% are therefore preferred in partially deacetylated products. However, starting materials in which the molar ratios of ethylene to vinyl acetate are 1 : 1 and the vinyl acetate contents run up to about 75 wt.-%, and which have gained little acceptance in the art on account of their sticky consistency, can also be converted to products having up to 10 mole-% double bonds, along with vinyl acetate contents if desired.

Iodine numbers of 2 to 91 are common in the products, although they may be even higher.

In general, it is not necessary to remove catalyst residues from the products prior to fabrication. Fabrication into sheets and molded products can be performed with surprising ease and simplicity by thermoplastic methods, using apparatus commonly used with thermoplastic polymers, following commonly used formulations, with the addition of fillers, heat stabilizers, ultraviolet stabilizers, etc.

It is especially advantageous to accomplish the deacetylation and the fabrication in a single procedure in the vacuum extruder, for example, or in other such apparatus.

The manufactured products can be used to special advantage where "non-polluting" plastics are desired, which when discarded can easily be degraded by the natural environment, since the double-bond content, especially when ultraviolet stabilization is limited or entirely omitted, permits degradation by natural ultraviolet radiation.

SUMMARY

Thus, the invention provides a method of deacetylation of ethylene-vinyl acetate copolymers to produce the corresponding olefinically unsaturated, linear polymers, which comprises deacetylating, by e.g. pyrolysis, ethylene-vinyl acetate copolymers under a vacuum of less than about 50 Torr (mm), by splitting acetic acid from the copolymers and removing acetic acid from the copolymers during the deacetylation. The acetic acid is preferably removed immediately after its formation. The copolymers are continuously stirred during the deacetylation, as by mixing or working in an extruder to facilitate the prompt removal of the acetic acid.

The copolymers can have a vinyl acetate content of about 0.5 – 70 wt.%; the reaction time is less than about 30 minutes; the temperature is about 160°–350° C. The reaction is preferably performed in the presence of a deacetylation catalyst in an amount effective to promote the reaction. The amount of the catalyst can be about 0.1–10 wt.% with respect to the copolymer. The catalyst can be a Lewis acid or a protonic acid, and is preferably zinc chloride. It is best to perform the deacetylation in the presence of an inert gas. It is best to exclude oxygen.

Further, the invention includes novel linear polymers, composed of ethylene groups and up to about 10 mole % of randomly distributed vinylene groups, and about 0–32.3 mole % of vinyl acetate groups. The amount of ethylene groups is at least 67.5%, and is desirably about 75.2 – 99.8%, preferably about 78.9 – 99.0 mole %. Desirably, the amount of vinylene groups is about 5.0 – 10.0 mole %, preferably 1.0 – 6.7 mole %. The vinylene groups are or include transvinylene groups. Desirably the amount of vinyl acetate groups is about 0.0 – 24.2 mole %, preferably about 0.0 – 22.1 mol %.

The used protonic acids are such of $p_{Ks}$-values lower 4, which additionally are not or little volatile at conditions of instant process.

Commonly a freshly produced product will have essentially no smell of acetic acid. It is estimated that even in the moment directly after production the amount of free gaseous acetic acid present in or near the product will be not more than some thousandth of wt=%, referred on the product.

Corresponding to this desirement, an immediate removal of acetic from the reactor gas room by means of vacuum is effected. In most times acetic acid will not remain is the gas room more than some 10 seconds, usually not more than some few seconds.

The resulting polymers are linear, this means not crosslinked and essentially not or only slightly branched.

EXAMPLES

Example 1 A 60 kg of Elvax 460 granules (EVA copolymer made by du Pont, having a tested vinyl acetate content of 18.5% by weight) were mixed in 15 kg portions with 37.5 g of anhydrous zinc chloride for each portion, in a 35-liter Papenmeier mixer at 720 rpm. The mixing time was 15 minutes. The coolant temperature in the cooling jacket of the mixer was maintained at 5° to 10° C by means of a Hokostat refrigerating unit using methanol as coolant. After the mixing process the zinc chloride was firmly adherent to the surface of the granules. The mixed material was poured into bags lined with polyethylene film for storage.

Example 2 A 120 kg of Lupolen V 2524 EX (EVA copolymer made by BASF, having a tested vinyl acetate content of 2.5% by weight) was mixed in 12-kilogram portions with 120 grams of anhydrous zinc chloride for each portion, in the mixer described in Example 1, at 1445 rpm. The mixing time was 5 minutes. The coolant was maintained at 20° C. After removal from the mixer the mixed material was stored as described in Example 1 for further use.

Example 3 A 100 kg of Alkathene VJF 502 granules (EVA copolymer made by ICI, having a tested vinyl acetate content of 8.5% by weight) were mixed in 10 kg portions with 25 g of anhydrous zinc chloride for each portion, in the mixer described in Example 1. The cooling jacket of the mixer was heated with water at 45° C. The mixing time was 10 minutes. The mixed material was stored in open polyethylene containers for further use.

Examples 1 B to 3 B

The mixtures of EVA copolymer and zinc chloride of Examples 1 A to 3 A were successively passed through a heated vacuum extruder for deacetylation. For this purpose a vacuum double screw extruder of the kind previously described was used, which is referred to as a two-shaft kneading disk screw press (Model ZSK 53/14 variable, made by Werner und Pfleiderer of Stuttgart), and which has, along a length of about 2.5 meters, a plurality of kneading and advancing zones as well as seven temperature zones Z1 to Z7, plus three vacuum zones VA1 to VA3, some of which are still further subdivided. The speed is variable between 36 and 300 rpm. This extruder could be operated either at a vacuum of about 25 Torr (water ring vacuum pump) or at 0.5 to 2.0 Torr (steam jet vacuum pump). The extruding nozzles were provided with Teflonized 4-mm round orifices.

The extruder was fed from an electronically controlled proportioning weigh scale to control the throughput of material through the extruder (in kg/h). The extruder input and the extruding nozzle area were shielded with carbon dioxide gas during operation. Immediately after leaving the nozzles, the extrudate was guided on rollers through a cooling trough containing cold water, then comminuted in a chopper, and poured under a carbon dioxide atmosphere into paper bags lined with polyethylene.

Tables 1 and 3 give the temperatures of the individual zones, the throughput and the detention times for the substances of Examples 1 to 3, as well as the partial or complete deacetylation achieved, based on the degree of deacetylation and the iodine number. Also given are the degree of polymerization and the crystallite melting points of the product.

In the tables the following abbreviations are used:

T1 to T7 = Inside wall temperatures in °C in temperature zones 1 to 7 of the double screw extruder, T1 indicating the temperature in zone 1, T2 the temperature in zone 2, etc.

$T_M$ = Mass temperature, measured with a hook probe in zone 6.

VA = Vacuum in Torr, stating the lowest and highest values at vacuum connections 1 to 3.

rpm = Revolutions of the double screw per minute

TP = Throughput in kilograms per hour

DT = Detention time in minutes from the entrance of the product into the input connection of the extruder to its emergence from the extruder nozzles.

DA = Degree of deacetylation.

I No. = Iodine number, Kaufmann $\overline{P}_n$ = Average degree of polymerization as determined with the membrane osmometer.

CMP(°C) = Crystallite melting point in degrees Centigrade as determined by differential thermoanalysis.

TABLE 1

| | $T_1$ | $T_2$ | $T_3$ | $T_4$ | $T_5$ | $T_6$ | $T_7$ | $T_M$ | VA | | | RPM | TP kg/h | DT min | DA | I No. | $\overline{P}_n$ | CMP (°C) |
|---|---|---|---|---|---|---|---|---|---|---|---|---|---|---|---|---|---|---|
| | ← °C → | | | | | | | | ← Torr → | | | | | | | | | |
| 1 a | 105 | 130 | 140 | 160 | 165 | 155 | 130 | 162 | 0.7 | to | 0.9 | 115 | 15.2 | 3.4 | 0.10 | 7 | 890 | 92 |
| 1 b | 105 | 170 | 190 | 200 | 205 | 190 | 180 | 201 | " | " | " | " | " | " | 0.27 | 15 | " | " |
| 1 c | 105 | 228 | 225 | 250 | 235 | 220 | 215 | 229 | 0.7 | " | 2.0 | " | " | " | 0.39 | 23 | " | 93 |
| 1 d | 110 | 230 | 250 | 250 | 250 | 230 | 220 | 241 | 0.7 | " | 1.2 | " | " | " | 0.44 | 25 | 900 | " |
| 1 e | 115 | 240 | 255 | 260 | 265 | 255 | 215 | 260 | " | " | " | " | " | " | 0.52 | 30 | " | 94 |
| 1 f | 115 | 250 | 270 | 285 | 280 | 270 | 215 | 279 | 0.9 | " | 1.5 | " | " | " | 0.60 | 35 | 890 | 95 |
| 1 g | 115 | 290 | 295 | 305 | 300 | 285 | 215 | 305 | 1.2 | " | 1.5 | " | 14.9 | " | 0.72 | 42 | 920 | 96 |
| 1 h | 115 | 318 | 322 | 323 | 320 | 310 | 222 | 330 | 1.0 | " | 1.5 | " | " | " | 1.00 | 63 | " | 102 |

The degree of polymerization test value depends to some extent on the membrane used in the osmoter, so that only the values for the substances of the same Example are entirely comparable with one another.

TABLE 2

| | $T_1$ | $T_2$ | $T_3$ | $T_4$ | $T_5$ | $T_6$ | $T_7$ | $T_M$ | VA | RPM | TP kg/h | DT min | DA | I No. | $\overline{P}_n$ | CMP (°C) |
|---|---|---|---|---|---|---|---|---|---|---|---|---|---|---|---|---|
| | ← °C → | | | | | | | | ← Torr → | | | | | | | |
| 2 a | 120 | 253 | 245 | 245 | 235 | 230 | 220 | 250 | 26 to 27 | 200 | 20.5 | 2.5 | 0.56 | 4 | 1070 | 114 |
| 2 b | 120 | 250 | 260 | 270 | 270 | 250 | 220 | 274 | " | " | " | " | 0.61 | 4 | " | " |
| 2 c | 120 | 250 | 290 | 295 | 290 | 270 | 220 | 301 | " | " | " | " | 0.71 | 5 | 1060 | " |
| 2 d | 125 | 270 | 312 | 325 | 310 | 290 | 220 | 323 | 27 to 28 | " | " | " | 0.91 | 6 | " | " |
| 2 e | 125 | 293 | 320 | 325 | 318 | 290 | 220 | 335 | " | " | " | " | 1.00 | 7 | " | " |

TABLE 3

| | $T_1$ | $T_2$ | $T_3$ | $T_4$ | $T_5$ | $T_6$ | $T_7$ | $T_M$ | VA | RPM | TP kg/h | DT min | DA | I No. | $\overline{P}_n$ | CMP (°C) |
|---|---|---|---|---|---|---|---|---|---|---|---|---|---|---|---|---|
| | ← °C → | | | | | | | | ← Torr → | | | | | | | |
| 3 a | 180 | 230 | 250 | 250 | 240 | 240 | 220 | 250 | 0.6 to 1.0 | 100 | 10.6 | 3.6 | 0.12 | 3 | 920 | 112 |
| 3 b | 135 | 290 | 290 | 295 | 295 | 275 | 220 | 300 | " | " | " | " | 0.51 | 12 | 870 | 113 |

TABLE 3-continued

| | | | | | | MIXTURE OF EXAMPLE 3 | | | RPM | TP kg/h | DT min | DA | I No. | $\overline{P}_n$ | CMP (°C) |
|---|---|---|---|---|---|---|---|---|---|---|---|---|---|---|---|
| $T_1$ | $T_2$ | $T_3$ | $T_4$ | $T_5$ | $T_6$ | $T_7$ | $T_M$ | VA | | | | | | | |
| ← | | | °C | | | → | | ← Torr → | | | | | | | |
| 3 c | 105 | 315 | 320 | 325 | 320 | 305 | 220 | 330 | " | " | 10.0 | " | 1.00 | 26 | 890 | 115 |

Tables 1 to 3 indicate that the degree of deacetylation increases mainly as the temperature in the extruder increases. The number of double bonds formed, measured by means of the iodine number, corresponds to the degree of deacetylation. In the case of complete deacetylation (E = 1), the number of double bonds corresponds to the vinyl acetate content of the starting substance. The unchanged degree of polymerization shows that no degradation of the macromolecules takes place. Apparently no crosslinking of the polymers takes place in the reaction, as indicated by measurements of the solubility of the reaction products compared with that of the starting substances in benzine, aromatic hydrocarbons such as toluene, and chlorinated aliphatics such as hexachloroethane.

Example 4 A

In each instance, 100 kg of Lupolen V 3510 K in granulated form (EVA copolymer made by BASF, having a tested vinyl acetate content of 13% by weight) was mixed with so much pulverized anhydrous zinc chloride that the weight percentage and the molar percentage of the zinc chloride in the mixture were as follows:

| | A | B | C | D | E |
|---|---|---|---|---|---|
| g of zinc chloride per kg of copolymer | 1.1 | 2.3 | 4.7 | 9.2 | 39.0 |
| wt.-% of zinc chloride | 0.10 | 0.22 | 0.46 | 0.91 | 3.75 |
| mole-% of zinc chloride | 0.02 | 0.04 | 0.10 | 0.20 | 0.87 |

The mixing of the individual batches was performed in 10 kg portions in the mixer described under Example 1, at 720 rpm. The temperature in the cooling jacket of the mixer was maintained at 20° C by water cooling. The mixing time was uniformly 10 minutes. The mixtures were stored as described in Example 1 A for later use.

Example 4 B

The mixtures described in Example 4 A were passed through a heated vacuum extruder for deacetylation. The model of the extruder and the arrangement of the process were the same as given for Examples 1 B to 3 B.
The deacetylation was performed as follows:

Temperatures (in °C):

-continued

| T1 | T2 | T3 | T4 | T5 | T6 | T7 | $T_M$ |
|---|---|---|---|---|---|---|---|
| 105 | 282 | 302 | 310 | 310 | 292 | 210 | 310 |

Throughput TP = 12.0 kg/h
Detention time DT = 3.8 minutes at 85 rpm
Pressure VA = 26 to 27 Torr.

Table 4 lists the deacetylation degree and the iodine number in relation to the catalyst concentration.

Table 4

| Mixture of Example | Zinc chloride wt.-% | Zinc chloride mole-% | Degree of deacetylation | Iodine No. | $\overline{P}_n$ | CMP °C |
|---|---|---|---|---|---|---|
| 4 A | 0.10 | 0.02 | 0.27 | 10 | 840 | 99 |
| 4 B | 0.22 | 0.04 | 0.56 | 22 | 840 | 101 |
| 4 C | 0.46 | 0.10 | 0.75 | 30 | 830 | 102 |
| 4 D | 0.91 | 0.20 | 0.86 | 36 | 835 | 103 |
| 4 E | 3.75 | 0.87 | 1.00 | 42 | 835 | 104 |

Example 5 A

In each instance, 10 kg of Alkathene A 6455 (EVA copolymer made by ICI and having a tested vinyl acetate content of 14.3 wt.-%) in granular form was mixed with the number of grams of the compounds listed in Table 5, in a 35-liter Papenmeier mixer. The gram weights of the compounds represent in each case 0.11 mole-% with respect to the amount of EVA copolymer put in.

The mixing was carried out in two steps:

I: 15 minutes of roughening the surface of the granules at 600 rpm.

II: Adding the compounds listed in Table 5 and 5 more minutes of mixing of the components at the same rpm.

The temperature in the mixer was maintained at 35° C by water cooling.

The mixtures were kept in sealed polyethylene bags for later use.

Table 5 A

| | Compound | g/kg Alkathene A 6455 |
|---|---|---|
| A | Zinc chloride | 4.84 |
| B | Aluminum tribromide | 9.47 |
| C | Iron(III) chloride | 5.74 |
| D | Tin(II) chloride dihydrate | 8.01 |
| E | Palladium chloride | 6.29 |
| F | p-Toluenesulfonic acid | 6.12 |
| G | β-naphthalenesulfonic acid | 7.37 |
| H | metaphosphoric acid | 2.83 |

Example 5 B

The mixtures described in Example 5 A were passed through a heated vacuum extruder for deacetylation. The model of the extruder and the arrangement of the process were the same as given in Examples 1 B to 4 B.
The deacetylation was performed as follows:

Temperatures (° C):

-continued

| T1 | T2 | T3 | T4 | T5 | T6 | T7 | T$_M$ |
|---|---|---|---|---|---|---|---|
| 105 | 318 | 320 | 325 | 321 | 308 | 222 | 329 |

Throughput TP = 14.8 kg/h
Detention time DT = 3.4 minutes at 112 rpm
Pressure VA = 29–30 Torr.

Table 5 B gives the degree of deacetylation, the iodine number, and the crystallite melting point.

Table 5 B

| Mixture of Example | Deacetylation Catalyst | Degree of deacetylation | Iodine No. | CMP °C |
|---|---|---|---|---|
| 5 A | Zinc chloride | 1.00 | 46 | 103 |
| 5 B | Aluminum tribromide | 0.22 | 9 | 97 |
| 5 C | Iron(III) chloride | 0.51 | 21 | 99 |
| 5 D | Tin(II) chloride hydrate | 0.74 | 33 | 100 |
| 5 E | Palladium chloride | 0.26 | 10 | 97 |
| 5 F | p-Toluenesulfonic acid | 0.87 | 38 | 102 |
| 5 G | β-Naphthalenesulfonic acid | 0.93 | 40 | 102 |
| 5 H | Metaphosphoric acid | 0.17 | 6 | 97 |
| Example for comparison, using no deacetylation catalyst: | | 0.00 | <1 | 96 |

Accordingly, the individual catalysts, when added in the same quantity reckoned in molar percentage, have different degrees of activity.

Example 6 A 3.50 kg of Levapren 336 (EVA copolymer made by Bayer, having a tested vinyl acetate content of 33.0 wt.-%) in lens-shaped granule form was plasticized on a roller mixer at a roll temperature of 100° C, and 17.5 g of anhydrous zinc chloride was worked uniformly into the mass while the temperature remained the same. The roller skin was cut after cooling into dice-like pieces measuring about 3 mm on a side.

Example 7 A 20.0 kg of Levapren 400 (EVA copolymer made by Bayer, having tested vinyl acetate content of 41.2 wt.-%) was treated in the roller mixer with 0.1 kg of anhydrous zinc chloride as described in Example 6 A. The roller skin was finely diced.

Example 8 A

A roller skin was prepared from a mixture of 5.0 kg of Lupolen V 3510 K (EVA copolymer made by BASF and having a tested vinyl acetate content of 13.0 wt.-%), 5.0 kg of Alkathene 24-03 (EVA copolymer made by ICI and having a tested vinyl acetate content of 24.4 wt.-%) and 0.06 kg of anhydrous zinc chloride in accordance with Example 6 A, and it was cut into small pieces.

Example 9 A 9.0 kg of Alkathene VJG 502 (EVA copolymer made by ICI and having a tested vinyl acetate content of 8.4 wt.-%) and 1.0 kg of Elvax 40 (EVA copolymer made by du Pont and having a tested vinyl acetate content of 41.0 wt.-%) were plasticized together on the roller mixer described in Example 6 A at 115° C, and 0.05 kg of anhydrous zinc chloride was uniformly distributed in the mixture at the same temperature. The cooled roller skin was finely diced.

Examples 6 B to 9 B

The mixtures prepared in Examples 6 A to 9 A were passed through a heated vacuum extruder for deacetylation. The extruder model and the process arrangement were the same as described in Examples 1 B to 4 B. The deacetylation was performed under the conditions stated in Table 6.

Table 6 also gives the degrees of acetylation achieved, the iodine numbers, the Shore hardnesses A and the crystallite melting points.

TABLE 6

| EXAMPLE | MASS TEMPERATURE °C(T$_M$) | DETENTION TIME | DEGREE OF DEACETYLATION | IODINE NUMBER | SHORE HARDNESS A PER DIN | CMP (°C) |
|---|---|---|---|---|---|---|
| 6 | 230 | 4 | 0.25 | 27 | 73 | — |
| 7 | 250 | 3.6 | 0.19 | 23 | 59 | — |
| 8 | 275 | 2.9 | 0.39 | 23 | 93 | 114 |
| 9 | 315 | 3.8 | 1.00 | 36 | 95 | 93 |

Example 10 A 6 g of anhydrous zinc chloride was dissolved in 7.5 ccm of dry acetic ester, and 50 ccm of benzene was added. The solution was filtered and charged into a 2-liter wide necked flask having a ground glass stopper, together with 300 g of Alkathene A 6455 in granulated form (EVA copolymer made by ICI, having a tested vinyl acetate content of 14.3% by weight). The mixture was shaken for 24 hours at room temperature on a shaker mixer. After this time the liquid phase had been completely absorbed by the EVA copolymer.

The solvent mixture was then removed by distillation at reduced pressure, at 50° C.

Example 11 A 400 g of Alkathene VJF 502 in granular form (EVA copolymer made by ICI and having a tested vinyl acetate content of 8.5% by weight) and 2.3 g of α-naphthalenesulfonic acid were dissolved in 3800 ccm of toluene at ebullition, and the solvent was then removed at

Examples 10 B and 11 B

The EVA copolymers containing catalyst as described in Examples 10 A and 11 A were deacetylated as follows:

In a 2-liter autoclave heated at 290° C and equipped with a paddle stirrer running along the walls, and with a vacuum-proof and pressure-proof charging connection, 300 g of catalyst-containing material was charged with the stirrer running at a moderate speed. The charging valve was closed and the nitrogen feed was simultaneously shut off. The nitrogen feed tube was then connected to a water ring vacuum pump and a vacuum of 30 Torr was produced.

After 15 minutes the heating and stirring were stopped and the vacuum was again replaced by a current of nitrogen. After the autoclave had cooled to 120° C, 1.5 l of benzine of the 140°–200° C fraction was poured in, and after the charging valve of the autoclave had been closed, the autoclave was heated at 180° C.

Example 12

Alkathene VJF 502 (EVA copolymer made by ICI and having a tested vinyl acetate content of 8.5% by weight) in granular form and anhydrous zinc chloride in powder form were fed under a carbon dioxide atmosphere to the vacuum extruder described in Examples 1 B to 3 B in a ratio of 1000 : 2.5 by weight, by means of two separate proportioning weigh scales. The extruded material was chopped up after cooling, in a chopping machine, and was poured under a carbon dioxide atmosphere into paper bags lines with polyethylene film.

The temperatures T1 to T7 in the corresponding heating zones Z1 to Z7 of the extruder, the mass temperature TM of the EVA copolymer-catalyst mixture, the vacuum VA in the vacuum connections, the rpm, the throughput TP, the detention time DT, the degree of deacetylation, the iodine numbers and the crystallite melting points of the deacetylated products are given in Table 8.

TABLE 8

| | $T_1$ | $T_2$ | $T_3$ | $T_4$ | $T_5$ °C | $T_6$ | $T_7$ | $T_M$ | VA Torr | | RPM | TP kg/h | DT min | DA | I No. | $P_n$ | CMP (°C) |
|---|---|---|---|---|---|---|---|---|---|---|---|---|---|---|---|---|---|
| 12 a | 190 | 230 | 230 | 230 | 235 | 220 | 220 | 225 | 1 | 0.7 | 0.45 | 90 | 9.8 | 3.7 | 0.04 | 1 | 910 | 112 |
| 12 b | 190 | 255 | 250 | 250 | 245 | 235 | 220 | 250 | " | " | " | " | " | " | .13 | 3 | 900 | " |
| 12 c | 170 | 280 | 270 | 275 | 270 | 260 | 220 | 278 | " | " | " | " | " | " | 0.33 | 8 | " | " |
| 12 d | 135 | 290 | 290 | 298 | 290 | 280 | 220 | 298 | " | " | " | " | " | " | 0.48 | 12 | 890 | 113 |
| 12 e | 105 | 305 | 312 | 320 | 320 | 300 | 220 | 320 | " | " | " | " | " | " | 0.84 | 22 | " | 114 |
| 12 f | 105 | 310 | 320 | 320 | 320 | 310 | 220 | 335 | " | 0.9 | " | " | " | " | 1.00 | 26 | 900 | 115 |
| 12 g | 105 | 307 | 315 | 320 | 318 | 305 | 220 | 320 | 1.2 | 0.7 | 0.7 | 40 | 9.8 | 4.2 | 1.00 | 26 | 930 | " |
| 12 h | 100 | 320 | 340 | 345 | 345 | 325 | 225 | 350 | 26 | 26 | 28 | 200 | " | 2.5 | 1.00 | 26 | 880 | " |
| 12 i | 100 | 315 | 335 | 335 | 335 | 315 | 215 | 325 | 27 | 28 | 28 | 150 | 10.5 | 3.0 | 0.72 | 18 | " | 114 |

TABLE 9

Mechanical Properties of Completely Deacetylated EVA Copolymers

| Product of Example No. | Iodine No. Kaufmann | Tensile Strength DIN 53,455 Test Rate 125 mm/min (Test specimen No. 4) | % Elongation at Rupture | Shore Hardness C |
|---|---|---|---|---|
| 2 e | 7 | 114 | 453 | 78 |
| 3 c | 26 | 110 | 410 | 75 |
| 4 e | 42 | 80 | 470 | 73 |
| 1 h | 63 | 76 | 402 | 72 |

After 5 minutes of heating, the stirring was resumed and heating was continued for 25 minutes with the stirrer running at high speed, and then the temperature was allowed to diminish to room temperature with continued stirring.

After removal of the suspended resulting polymer material the portion of the polymer dissolved in benzine was precipitated with an excess of methanol; the precipitated material was suction filtered and dried in a high vacuum. A fine, white powder was obtained.

Table 7 gives the degrees of deacetylation, the iodine numbers and the crystallite melting points of the white powder.

Table 7

| Material of Example | Degree of Deacetylation | Iodine number | CMP °C |
|---|---|---|---|
| 10 | 0.88 | 41 | 103 |
| 11 | 0.71 | 18 | 114 |

Mechanical properties of completely deacetylated EVA copolymers of the foregoing examples are set forth in Table 9.

Example 13

100 kg of an EVA copolymer in the form of lens-shaped granules having a tested vinyl acetate content of 47.5 wt.-% and an average degree of polymerization $P_n$ of 2500 was mixed in 10 kg portions with 25 g of anhydrous zinc chloride for per portion, in the mixer described in Example 1. The cooling jacket of the mixer was maintained at −20 to −10° C by means of a Hokostat refrigerating system using methanol as coolant. The mixing time amounted to 3 minutes at 720 rpm. After removal from the mixer the material was deacetylated as described in Example 1 B. Data is set forth in Table 10.

TABLE 10

| | | | | | | Mixture of Example 13 | | | | | | | | |
|---|$T_1$|$T_2$|$T_3$|$T_4$|$T_5$|$T_6$|$T_7$|$T_M$|VA|RPM|TP kg/h|DT min|DA|1 No|$\bar{P}_n$|
| |←|    |    | °C |    |    |    |→  |←Torr→| | | | | | |
| 4 a | 80 | 220 | 233 | 245 | 248 | 218 | 170 | 235 | 0.6–2 | 85 | 10 | 3.8 | 0.08 | 11 | 2400 |
| 4 b | 95 | 228 | 246 | 265 | 301 | 240 | 173 | 255 | "  | "  | "  | "   | 0.12 | 18 | 2380 |
| 4 c | 95 | 235 | 255 | 275 | 283 | 250 | 178 | 265 | "  | "  | "  | "   | 0.20 | 30 | 2490 |
| 4 d | 95 | 233 | 252 | 270 | 283 | 254 | 182 | 264 | "  | 40 | "  | 4.2 | 0.35 | 51 | 2320 |

Example 14 (Given for purposes of comparison)

Approximately 3 g of an EVA copolymer containing 18.0% vinyl acetate by weight (Alkathene 18-02, a product of ICI) was heated in a round 100 ccm flask for 15 minutes at 375° C in a current of helium. 5.17 mole-% of acetic acid was removed, corresponding to a degree of deacetylation of 0.78. The product in the reaction vessel was discolored and so greatly crosslinked that it could not be dissolved in hot benzine of the 140°–200° C fraction.

Example 15 (Given for purposes of comparison)

Approximately 2 g of an EVA copolymer containing 13.0% vinyl acetate by weight (Lupolen V 3510 K, a product of BASF) was heated under nitrogen at 425° C for 5 minutes in the apparatus of Example 13. The acetic acid was thus removed quantitatively from the EVA copolymer. The deacetylated material was very brittle, and mostly soluble in hot benzine of the 80°–100° C boiling range. The product had an unpleasant smell. Due to the high-temperature heating, a great amount of cracking had occurred in addition to the removal of the acetic acid. Average molecular weights of approximately 7000 were measured. Severe diffusion phenomena interfered considerably with the measurements, i.e., considerable amounts of fractions of very low molecular weight were present in the thermolyzed material. Double bonds were measured in the amount of 2.20 mole-%.

What is Claimed is:

1. Method of deacetylation of ethylene-vinyl acetate copolymers to produce the corresponding olefinically unsaturated, linear polymers which comprises deacetylating ethylene-vinyl acetate copolymers in presence of a catalyst for the deacetylation under a vacuum of less than about 50 Torr, by splitting acetic acid from the copolymers while continuously stirring the copolymers wherein the deacetylation is performed at a temperature of about 160° – 350° and wherein said catalyst is a Lewis acid or a protonic acid: and removing acetic acid from the copolymers.

2. Method of claim 1, said copolymers having a vinyl acetate content of about 0.5 – 70 wt.%.

3. Method of claim 1, the deacetylation being performed in a time period of less than about 30 minutes.

4. Method of claim 1, wherein the deacetylation is performed in the presence of a deacetylation catalyst in the amount of 0.01 – 10 wt.% with respect to the copolymer.

5. Method of claim 1, wherein the catalyst is zinc chloride.

6. Method of claim 1, wherein the deacetylation is performed in the presence of an inert gas.

7. Method of claim 4, wherein the copolymer and catalyst are combined by mixing in a kneader, a roller mixer, an extruder, or a shaking apparatus.

8. Method of claim 4, wherein the copolymer in granular, powder or plasticized form is admixed with the deacetylation catalyst in solid form.

9. Method of claim 4, wherein the copolymer in solid form is imbeded with a solution of the catalyst in a solvent, and thereafter the solvent is removed from the resulting admixture.

10. Method of claim 4, wherein the copolymer and the catalyst are combined by dissolving the copolymer and catalyst in a solvent, and the solvent is removed from the resulting admixture.

11. Method of claim 4, wherein the catalyst is combined with the copolymer by producing the copolymer by polymerization of ethylene and vinyl acetate in the presence of the catalyst.

12. Method of claim 4, wherein the copolymer and the catalyst are combined, and thereafter the deacetylation is performed.

13. Method of claim 4, wherein the copolymer and the catalyst are combined by incorporating the catalyst and the copolymer during the deacetylation.

14. Method of claim 1, wherein the copolymer is worked during the deacetylation in a vacuum extruder.

15. Method of claim 1, wherein the deacetylation is a partial deacetylation.

16. Method of claim 1, wherein the deacetylation is a complete deacetylation, producing unsaturated, linear polyethylene.

17. Method of claim 1, wherein the vinyl acetate content of the copolymer is about 0.5 – 60 wt.%, and the deacetylation is performed in a time period of less than about 30 minutes.

18. Method of claim 17, wherein the catalyst is zinc chloride.

19. Method of claim 4, wherein the copolymer is worked during the deacetylation in a vacuum extruder.

20. Method of claim 19, wherein the deacetylation is a complete deacetylation, producing unsaturated, linear polyethylene.

21. Method of claim 2, wherein the catalyst is zinc chloride.

22. Method of claim 3, wherein the catalyst is zinc chloride.

23. Method of claim 6, wherein the catalyst is zinc chloride.

24. Method of claim 17, wherein the catalyst is zinc chloride.

* * * * *

UNITED STATES PATENT AND TRADEMARK OFFICE
CERTIFICATE OF CORRECTION

PATENT NO. : 4,004,069
DATED : January 18, 1977
INVENTOR(S) : Dr. Günther Bernhardt,
Dr. Werner Trautvetter and, Dr. Rüdeger Minke It is certified that error appears in the above-identified patent and that said Letters Patent are hereby corrected as shown below:

Columns 9 and 10, Table 1, 1c, under $T_2$, change "228" to --220--.

Columns 9 and 10, Table 1, 1c, under $T_4$, change "250" to --230--.

Columns 15 and 16, Table 8, 12f, under $T_m$, change "335" to --333--.

Columns 17 and 18, Table 10, 4d, under DA, change "0.35" to --0.33--.

Signed and Sealed this

Twenty-sixth Day of April 1977

[SEAL]

Attest:

RUTH C. MASON
*Attesting Officer*

C. MARSHALL DANN
*Commissioner of Patents and Trademarks*